United States Patent
Crozier et al.

(10) Patent No.: US 10,660,350 B2
(45) Date of Patent: May 26, 2020

(54) FOOD COMPOSITIONS THAT ENHANCE NITRIC OXIDE MEDIATED SIGNALLING

(71) Applicant: The Hershey Company, Hershey, PA (US)

(72) Inventors: Stephen J. Crozier, Hummelstown, PA (US); David A. Stuart, Hershey, PA (US)

(73) Assignee: The Hershey Company, Hershey, PA (US)

( * ) Notice: Subject to any disclaimer, the term of this patent is extended or adjusted under 35 U.S.C. 154(b) by 691 days.

(21) Appl. No.: 14/966,857

(22) Filed: Dec. 11, 2015

(65) Prior Publication Data

US 2016/0095342 A1    Apr. 7, 2016

Related U.S. Application Data

(63) Continuation-in-part of application No. PCT/US2014/042312, filed on Jun. 13, 2014.

(60) Provisional application No. 61/834,569, filed on Jun. 13, 2013.

(51) Int. Cl.
| | | |
|---|---|---|
| A23L 2/38 | (2006.01) | |
| A23G 1/00 | (2006.01) | |
| A23L 33/105 | (2016.01) | |
| A23L 29/20 | (2016.01) | |
| A23L 29/212 | (2016.01) | |

(52) U.S. Cl.
CPC .............. *A23L 2/38* (2013.01); *A23G 1/00* (2013.01); *A23L 29/20* (2016.08); *A23L 29/212* (2016.08); *A23L 33/105* (2016.08); *A23V 2002/00* (2013.01)

(58) Field of Classification Search
CPC ........ A23L 33/00; A23L 33/105; A23L 29/20; A23L 2/38; A23L 29/212; A23G 1/00
USPC ........................................ 426/573, 578, 598
See application file for complete search history.

(56) References Cited

U.S. PATENT DOCUMENTS

| | | | |
|---|---|---|---|
| 7,048,941 B2 | 5/2006 | Altaffer | |
| 8,088,431 B2 | 1/2012 | Ward | |
| 8,298,589 B1 | 10/2012 | Bryan | |
| 8,303,995 B1 | 11/2012 | Bryan | |
| 2010/0047344 A1* | 2/2010 | Lundberg | A23L 2/52 424/466 |
| 2011/0135786 A1* | 6/2011 | Milici | A23G 1/46 426/2 |
| 2011/0177174 A1 | 7/2011 | Crowley | |

FOREIGN PATENT DOCUMENTS

WO    WO2014201360    12/2014

OTHER PUBLICATIONS

S. Lidder et al. "Vascular effects of dietary nitrate (as found in green leafy vegetables and beetroot) via the nitrate-nitrite-nitric oxide pathway", 2012, British Journal of Clinical Pharmacology 75:3/ 677-696.*
PCT Search Report PCT/US2014/042312.
Bailey, 2009, J Appl Physiol 107:1144-1155.
Bailey, 2010, J Appl Physiol 109:135-148.
Bondonno, 2012, Free Radical Biology & Medicine 52: (2012) 95-102.
Gladwin, 2005, Nature Chemical Biology vol. 1, No. 6, 308-314.
Larsen, 2007, Acta Physiol 191: 59-66.
Monahan, 2011, J Appl Physiol 111: 1568-1574.
Peri, 2005, Free Radical Biology & Medicine 39: 668-681.
Rocha, 2010, Diffusion of nitric oxide through the gastric wall upon reduction of nitrite by red wine: Physiological impact, Nitric Oxide (2010), doi:10.1016/j.niox.2010.01.003.
Webb, 2008, Hypertension 51;784-790.

* cited by examiner

*Primary Examiner* — Jyoti Chawla
(74) *Attorney, Agent, or Firm* — Design IP

(57) ABSTRACT

The invention includes compositions and methods for improving exercise performance or improving recovery of muscle tissue after exercise performance. One method includes administering a composition of a plant-derived nitrate and a cocoa-derived product daily and before exercise. The synergistic combination of nitrate and cocoa polyphenols acts to improve recovery from a strenuous exercise bout.

7 Claims, No Drawings

FOOD COMPOSITIONS THAT ENHANCE NITRIC OXIDE MEDIATED SIGNALLING

REFERENCE TO RELATED APPLICATIONS

This application claims priority benefit of U.S. Provisional Application 61/834,569, filed Jun. 13, 2013, and PCT application PCT/US2014/042312, filed Jun. 13, 2014, and the entire contents of these applications are hereby incorporated by reference.

FIELD OF THE INVENTION AND INTRODUCTION

The invention relates to biologically active compounds present in plants, especially *Theobroma cacao*, that can be used to improve health or enhance NO* (nitric oxide) signaling when taken in combination with a nitrate-containing food product, and especially a plant-derived nitrate source. In another general aspect, the combination of cocoa compounds and plant-derived nitrates are used to enhance exercise recovery when administered on a daily basis and/or before exercise. In other aspects, the invention provides a food or beverage designed specifically to provide both cocoa polyphenols and vegetable-derived nitrates for enhancing the production of NO* in the body and increasing NO*-mediated signaling under low oxygen and/or low pH conditions (primarily exercise). Thus, the administration of the combination products improves exercise performance and enhances recovery post-exercise via, for example, increased blood flow to muscle tissue and related NO*-mediated mechanisms.

RELEVANCE OF THE INVENTION AND DESCRIPTION OF RELATED ART

An increasing number of published reports show the health benefits of many compounds found in cocoa products, especially polyphenol or flavanol compounds. Most of this evidence relates to cellular studies or conditions where cells of an animal are directly treated by these compounds. These studies attempt to simulate conditions found after the absorption of cocoa through the intestines in humans following oral administration. In addition, many reports indicate the importance of vegetables in the diet, and vegetables are a source of nitrates. Among the reasons for looking at nitrate levels in humans are those that impact exercise and recovery from exercise. While not specifically mentioning nitrates, one report notes that plasma nitrite levels decrease during intense exercise (Larsen et al., Acta Physiol 2007), which thereby limits the ability to generate NO* during subsequent exercise bouts. Ingestion of dietary nitrite or nitrate before exercise could replenish the nitrite utilized during the previous exercise bout and maximize the potential for NO* generation during subsequent exercise bouts.

The appearance of nitrite in the peripheral circulation following direct nitrite consumption is rapid and does not match with that of polyphenols, such as cocoa polyphenols, if consumed at the same time. In contrast, the appearance of nitrate-derived compounds in the peripheral circulation is relatively slow and matches well with the availability of polyphenols or flavanols. However, no evidence indicates the benefits of combining cocoa and/or cocoa-derived flavanol extracts, for example, with nitrates to improve exercise performance or post-exercise recovery. The combination of cocoa with nitrates, therefore, represents an ideal vehicle for delivery of nitrate that can be subsequently oxidized in the body to NO* and aid in recovery. The benefits of NO* in muscle and tissue recovery and peripheral circulation are well known. Similarly, there are many known health benefits associated with cocoa consumption and cocoa is a rich source of catechol-containing polyphenols.

SUMMARY OF THE INVENTION

In one aspect, the invention addresses the problem of the decrease in available plasma nitrite levels during and after an intense exercise bout (Larsen et al., Acta Physiol 2007), which thereby limits the ability to generate NO* during subsequent exercise bouts. Ingestion of dietary nitrite or nitrate before exercise can replenish the nitrite utilized during a first exercise bout and maximize the potential for NO* generation during subsequent exercise. However, the appearance of nitrite in the peripheral circulation following direct nitrite consumption is rapid and does not match with that of polyphenols if consumed at the same time. In contrast, the appearance of nitrate-derived nitrites in the peripheral circulation is relatively slow and matches well with that of properly formulated polyphenols if consumed together. Thus, the invention provides a combination of cocoa and nitrate for administration at particular times in order to improve exercise recovery and enhance performance, for example in multiple exercise bouts. There are many health benefits associated with vegetable consumption and vegetables are a rich source of nitrate. Plant-derived nitrates therefore represent a preferred vehicle for delivery of nitrate that can be subsequently oxidized in the body to NO*. Similarly, there are many health benefits associated with cocoa consumption and cocoa is a rich source of catechol-containing polyphenols. Thus, in another aspect, the invention encompasses a combination of cocoa and plant-derived nitrates formulated to enhance the conversion of dietary nitrate to nitrite, with the resulting appearance of nitrite in the peripheral circulation, at approximately 3 hours after oral administration. This administration and formulation also takes advantage of the appearance of polyphenols in the circulation following the ingestion of dietary sources, which peaks at about 2 hours and is maintained until approximately 4 hours post-ingestion. Accordingly, in one aspect of the invention, the combination of a dietary nitrate and cocoa polyphenols should be consumed 3-4 hours before anticipated peak exercise or NO* demand such that the potential supply of nitrite from the oral administration and the demand for NO* will be most evenly matched.

Previous studies have demonstrated increased exercise capacity with 5 mmol nitrate (310 mg) (Bailey et al., J Appl Physiol 2009) and dose-dependent changes in NO*-mediated blood flow increases with 5 to 26 grams of cocoa (Monahan et al., J Appl Physiol 2011). According to the advantageous methods and combination food products of the invention, a synergistic combination with the two food products should be formulated to provide approximately 100-200 mg of nitrate and 2.5 to about 5 grams of natural cocoa per dose or single-serving product. Additional cocoa powder can be used for flavoring, but the about 2.5 to about 5 grams of natural cocoa powder (not treated with alkaline), or the equivalent in cocoa solids, appears to show the desired level of synergy. Alternatively, a cocoa extract having cocoa polyphenols can be used, where the amount of cocoa polyphenols approximates the total polyphenol content in about 2 to about 5 grams of natural cocoa powder.

Thus, in more particular aspects, the invention includes a method of enhancing the nitric oxide signaling of a human comprising administering the synergistic combination of an effective amount of both a plant-derived or vegetable-derived nitrate source and cocoa solids, typically in the form of a cocoa powder or a similar cocoa product. In another aspect, the invention includes a method of improving exercise performance, reducing muscle fatigue, or improving post-exercise recovery comprising providing a food product where a single dose or serving has approximately 100-200 mg of a plant-derived nitrate or more, as well as about 2.5 to about 5 g of natural cocoa powder, or the equivalent amount of cocoa solids. The cocoa powder or cocoa-derived product preferably has not been treated with alkali conditions during processing, as this process is known to reduce the levels of beneficial cocoa polyphenol compounds. The food product can be administered each day to improve nitric oxide signaling. In addition, the food product can be administered approximately 3 or 4 hours prior to a first exercise period (bout) so that the subject can better generate nitric oxide after this first exercise period and the subject's performance in a second exercise period is measurably improved compared to the performance with a control food product or only one of the plant-derived nitrate or cocoa. Thus, the improvement is beyond that seen or possible when solely a nitrate is administered or solely a cocoa product is administered prior to exercise. In addition, exercise after the initial administration of a food product of the invention can itself lead to improved exercise performance as measured in a number of possible exercise regimens, such as those noted in the Examples. In more particular embodiments, the cocoa powder is present at approximately 2 to 5 g, or alternatively an equivalent amount of cocoa solids from a cocoa-derived product is present. For example, the cocoa solids can be found in a chocolate liquor (approximately 40-50% cocoa solids), a cocoa bean extract, a low fat cocoa powder (approximately 85-90% cocoa solids), a defatted cocoa powder (approximately 90-95% cocoa solids), or a non-fat cocoa powder (approximately 95% or more cocoa solids). Some cocoa bean extracts may contain concentrated amounts of cocoa-derived compounds and could therefore be used in proportionally lower amounts than those noted here for cocoa powder. Also, in more particular embodiments, the plant-derived nitrate is selected from one or more of beet, rhubarb, arugula, hawthorne, or other nitrate-rich fruit or vegetable, or extracts thereof. In preferred aspects, a second exercise period is conducted within 3 or 4 hours of the first exercise period. The improvement in exercise performance can be measured in many ways known in the art, including, but not limited to VO2 max, power output, peak ventilation, or anaerobic threshold. For example, a change or increase in VO2 max indicates an improvement, a change or increase in peak power at VO2 max indicates an improvement, and a rise in power at approximately the subject's aerobic threshold indicates an improvement. All of these measurements as well as blood tests, such as mmol/L of lactate, and other testing factors can be used to compare the results using the combination food products of the invention to a control, calorie-adjusted product, or control products having only one of cocoa or plant-derived nitrate. Those of skill in the art are familiar with methods to measure VO2 max, peak power, and other factors related to physical exertion during exercise.

In other aspects, the invention includes a food product, such as an energy bar or beverage, having a synergistic combination of a flavanol-containing cocoa product and a plant-derived nitrate source formed into a single dose. The food product comprises approximately 100-200 mg of plant-derived nitrates as an extract of a plant material and 2.5 to 5 g of cocoa powder, or the equivalent amount of a cocoa solids-containing product. Typically, the cocoa is not treated with alkali conditions during processing into cocoa powder or cocoa solids. When consumed, the product has the ability to generate nitric oxide between a first exercise period and a second exercise period is improved over that possible when solely a nitrate is administered or solely a cocoa product is administered prior to exercise. The food product, in preferred embodiments, has at least one plant-derived nitrate source selected from a beet root extract or a hawthorne extract. Also, the food product can preferably use a cocoa powder present at 2.5 to 5 grams per dose.

Previously, no report discussed cocoa products, cocoa powders, or chocolate products in combination with a plant-derived nitrate source as having a direct impact on nitric oxide metabolism or availability. The invention described here explains, at least in part, how the use of a cocoa powder-containing food product can lead to an improved exercise period, especially when multiple exercise bouts are involved in an activity. Many sports or fitness competitions employ a pattern of exertions over a relatively short period of time separated by recovery periods. The methods and food products of the invention can thus be especially useful in improving performance over the entire course of a multiple exercise competition.

Orally administrable or food products, such as part of a chocolate or cocoa product to be used as the cocoa product of this invention, can be one as described in B. Minifie, Chocolate, Cocoa, and Confectionery, 3d Ed., Aspen Publishers. In addition, for particular embodiments, parts and beans from *Theobroma cacao* can be used for the cocoa product. In addition, samples, mixtures and extracts derived from *Theobroma cacao* seeds (cocoa beans) contain especially high levels of epicatechin compounds, on the order of 30:1 epicatechin compared to catechin. In most other plants, this ratio is closer to 1:1. As used in this specification, the term "cocoa-derived epicatechin" polymer or composition or sample may refer to a sample or composition containing some level of other compounds within the polymer, such as catechin. The cocoa-derived epicatechin and its polymers are thus epicatechin-rich but may not be exclusively composed of epicatechin monomer units. As used herein, "epicatechin-rich polymers" refers to polymer compositions where on average the monomer units are predominantly epicatechin compounds, such as more than 70% or more than 80% or more than 90% or more than 95% epicatechin, or more, on average by weight. Preferably, the compositions of the invention will be derived from a cocoa bean or the nib of a cocoa bean, and will predominantly contain flavanols and polymers composed of epicatechin, in the ratio of approximately 30:1 over other related polymer compounds that can be combined into a procyanidin polymer in plants. However, other plant materials can also be used, such as apple and sorghum, or other plant sources high in type-B procyanidin polymers of epicatechin. Accordingly, various polymer compounds as well as combinations of polymer compounds, combinations with other edible nitrates, and compositions for oral administration, are specifically included in the invention.

In yet another aspect, the invention includes combinations of the plant-derived nitrate and cocoa with other beneficial food products or ingredients. For example, additional combinations can be made with food supplements or vitamins or herbal products, in particular but not limited to caffeine, green coffee extracts, tea or green tea extracts, epicatechin monomers, and/or theophylline or theobromine, food additives, food flavors, and food stabilizers or emulsifiers. One of skill in the art is familiar with a multitude of healthy, natural, or bio-active supplements or compounds available in the food, nutriceutical, and pharmaceutical fields that can be used in any of the above or other listed combinations in this specification.

The compounds and compositions derived from cocoa sources, such as cocoa powders and extracts of *Theobroma cacao* plants and beans, may have particular effectiveness in improving exercise recovery as explained here. The epicatechin polymers found in cocoa are primarily B-type procyanidins, with some A-type procyanidins and a number of possible permutations in the polymerization of (−)-epicatechin are known.

While the Examples below can show levels of improvement in exercise ability or nitric oxide utilization, the level of improvement need not necessarily reach a particular percentage improvement. Nevertheless, an improvement of at least 5%, 10%, or at least 15% over levels seen in control exercises are specifically included in the invention. The term "improvement" and its grammatical variations are not intended to require an exact change in ability or results.

Without limiting the scope of the invention to any particular hypothesis or method of action, the benefits of the cocoa-derived product in combination with a plant-derived nitrate can be the result of one or more effects in improving blood circulation, vasodilation, or vessel permeability. In addition, effects related to muscle-tissue regeneration or replenishing muscle glycogen or energy supplies can also be an aspect of the invention.

Various cocoa bean samples or products can be used as a source of the cocoa product used in the invention. In a preferred example, the cocoa-derived polymers are derived from unfermented cocoa beans, or raw "Lavado" beans. Examples with "Regular" beans, those that have been fermented and roasted in conventional processes know in the art, can also be used. As noted above, "Dutched" or alkali-treated samples are generally not used for the cocoa products of the invention, but could be used in combination with other cocoa products in some embodiments.

Throughout this disclosure, applicants refer to texts, journal articles, patent documents, published references, web pages, and other sources of information. One skilled in the art can use the entire contents of any of the cited sources of information to make and use aspects of this invention. In particular, the article by Monahan et al. (2011) J. Appl. Physiol. 111:1568-1574, is incorporated herein by reference. Each and every cited source of information is specifically incorporated herein by reference in its entirety. Portions of these sources may be included in this document as allowed or required. However, the meaning of any term or phrase specifically defined or explained in this disclosure shall not be modified by the content of any of the sources. The description and examples herein are merely exemplary of the scope of this invention and content of this disclosure and do not limit the scope of the invention. In fact, one skilled in the art can devise and construct numerous modifications to the examples listed below without departing from the scope of this invention.

DETAILED DESCRIPTION OF EXEMPLARY EMBODIMENTS

In one aspect the invention involves the use of cocoa from any source in combination with a food-appropriate nitrate source. The terms "cocoa extract," "cocoa bean composition," and "cacao bean composition" can be any of a variety of products and combinations of the cocoa bean-derived products noted in this disclosure or elsewhere. "Cocoa bean composition" and "cocoa products" are essentially interchangeable and mean a product made from a cacao bean. A "cacao bean sample" or a "cocoa bean sample" is a collection of cacao beans or the nibs of such beans from a desired set of sources or set of processing conditions. In addition, combinations of cocoa products or cocoa extracts involving cacao beans treated, processed, or selected under conventional methods can be combined with cacao bean compositions treated or processed with other methods, including washing, heating, and other methods intended to prohibit enzymatic activity in the harvested cacao bean.

In some examples of the compositions of the invention, a plant derived nitrate can be produced from a vegetable powder or herb powder or a juice made from vegetables or herbs. Vegetables, leaves and herbs can be dried on conventional spray dryers, a fluidized spray dryer, other spray dryer, or dried in conventional ovens in order to produce powder. More preferably, plant-derived nitrates in powder form can be produced from vegetable or herb juice and then drying the juice by spray drying. Preferred vegetables and herbs can be selected from lettuce leaf, rhubarb, coriander, fennel, basil, beet, and celery. In other embodiments, the juice itself can be used in producing the combination products of the invention. An adequate amount of vegetable juice containing 100-200 mg of nitrates can be mixed with 2 to 5 g of cocoa powder (of the equivalent amount of a cocoa solids containing product) and desired sweeteners and flavors to produce a product of the invention. In some embodiments, the product compositions of the invention can be a beverage, a gelled confectionary type product, or a solid food product. In addition, the compositions of the invention can be an ingredient to be used or incorporated into another final product. One of skill in the art is familiar with the various ingredients that can be used in making these or other products or ingredients as well as the methods for producing them. Exemplary methods and formulations are published in various sources, including B. W. Minifie, Chocolate, Cocoa, and Confectionary, Aspen Publishers. An example of a gelled product follows:

|  | approx. Weight % |
| --- | --- |
| beet juice (460 g) | 26 |
| dry sugar | 18 |
| corn syrup 63/44 | 38 |
| cocoa powder (162 g) | 11 |
| starch (Miraset 285) | 7 |
| salt | >0.2 |

The ingredients can be cooked at approximately 220 degrees F. until about 72% solids. The resulting mixture can be dried at 150 degree F. until it reaches approximately 84 to 86% solids. Lecithin can also be added with the cocoa powder, and various types of cocoa powders, cocoa extracts, and combinations of cocoa extracts and powders can be selected for use from those available or those noted here. Beet juice and corn syrup, or a percentage of the corn syrup, can also be substituted with a beet juice powder or other vegetable or herb powder as noted. Beet juice powder contains high levels of nitrates and has a sweet taste profile. Additional sweetener can be added to any selected combination, including a non-nutritive sweetener and other sweeteners available.

An example of a solid "bar" product follows:

A cooked syrup is prepared according to the following formula

|  | wt % | Batch wt |
| --- | --- | --- |
| Beet Juice | 15 | 75 |
| Sucrose | 35 | 175 |
| HFCS 55 | 20 | 100 |
| 43 DE Corn Syrup | 10.2 | 51 |
| Glycerine | 12 | 60 |
| Sorbitol 70% | 7 | 35 |
| Salt | 0.5 | 2.5 |
| Carageenan, GP 911 | 0.3 | 1.5 |
| Total: | 100 | 500 |

The ingredients can be heated and the glycerin and carrageenan added to the heated ingredients at about 120 F. This syrup is heated to about 240 F until desired thickness or a desired % solids content. This syrup is used as the "cooked syrup" below.

|  | wt % | batch wt grams |
| --- | --- | --- |
| Cooked Syrup (78-79% solids) | 38 | 151.093 |
| Cocoa powder, natural | 15 | 60 |
| Red Beet powder | 5 | 20 |
| Chocolate liquor | 41 | 164 |
| Lecithin | 0.5 | 2 |
| Optional flavor | 0.5 | 2 |
| Optional Flavor | 0.6 | 2.4 |
| Total: | 100.6 | 401.493 |

While mixing the syrup at low speed, the other ingredients are added until homogeneous, then slabbed, cooled and cut into bars. In other examples, the bars or solid products containing the plant nitrates and cocoa polyphenols can have one or more of the following ingredients: bittersweet chocolate; sucrose; sorbitol; corn syrup; carrageenan; high fructose corn syrup; cocoa butter; soy lecithin; natural cocoa powder; prune concentrate; plum puree; beet juice; beet powder; red beet powder; cinnamon; vanilla; salt; natural flavors, such as pomegranate or fruit flavor; milk or milk proteins.

Cocoa powder, as understood in the art, contains approximately 10-25% lipid fraction (cocoa butter). However, all or a percentage of the fat can be removed from the powders by pressing, by solvent or supercritical solvent extraction or any number of other methods, as known in the art. Thus, natural, defatted and/or low fat or non-fat cocoa powders are specifically included in the cocoa products or ingredients described here. Other cocoa products, such as breakfast cocoa, cocoa extracts, and chocolate liquor can also be used in the invention as these products all contain cocoa solids.

The cocoa compositions and products of the present invention can contain enhanced levels of epicatechin polymers or polymer compositions by supplementing or adding to levels from a purified source or extract.

The present invention also includes food products containing cocoa ingredients having enhanced levels of epicatechin or cocoa polymers or compositions. The term "food product" includes any edible or consumable product that can be ingested by humans or animals to provide nourishment or provide supplements, and includes but is not limited to chocolate foods, chocolate bars, chocolate candies, steeped cocoa beverages, chocolate drinks, chocolate-flavored foods, chocolate-flavored bars, chocolate-flavored candies, chocolate-flavored drinks, chocolate-coated foods, chocolate-coated bars, chocolate-coated candies, milk chocolate, dark chocolate, baking chocolate, semi-sweet baking chips, baked chocolate products, such as cakes, brownies and breads, reduced-sugar chocolate and reduced-fat chocolate.

EXAMPLES

In one exemplary experiment showing the usefulness and advantageous properties of the combinations of the invention, 24 middle-aged men and women are recruited and placed on a polyphenol- and nitrate-deficient diet. For each subject, one week's worth of meals are prepared at the study site and provided to the subjects with instructions on maintaining the study diet. Subjects return to the study site after first week to ensure weight stability and then a second week of meals are be provided. Subjects return after the second week and undergo testing (see below). Following testing, subjects are block randomized (3 men and 3 women) to 1 of the 4 following diets: control; cocoa polyphenol; nitrate; and cocoa polyphenol+nitrate. Then, one week's worth of meals corresponding to the 4 diets listed above are given to each subject. Subjects return to the study site after 1 week to ensure weight stability and then a second week of meals are provided. Subjects return after the 2nd week on the specified diet and undergo a second round of testing.

Testing Protocol

Group Diets each with test "product" administered as directed, include: Control (control diet plus macronutrient-matched control product administered twice a day); Cocoa Polyphenol (control diet plus product containing 2.5 g of cocoa powder administered twice a day); Nitrate (control diet plus product containing 100 mg nitrate administered twice a day); and Cocoa Polyphenol+Nitrate (control diet plus product containing 2.5 g cocoa powder and 100 mg nitrate administered twice a day). Subjects are provided breakfast with both servings of the appropriate product 3 hours before testing on the testing day.

Exercise Capacity: Subjects perform a standard test of maximal oxygen uptake on a cycle ergometer using a Parvometrics metabolic cart. Endpoints include VO2 max, power output (set number of watts per minute), peak ventilation (ratio VO2 max/power output in watts), and anaerobic threshold.

Muscle Metabolism: $^{31}$P-magnetic resonance spectroscopy (MRS) can be used to assess muscle metabolism. MRS is performed by using a 1.5-T General Electric EXCITE system operating at 25.86 MHz for $^{31}$P. Subjects are positioned supine, feet first and will remain in this position for ~60 min. $^{31}$P-MRS data can be acquired with a 78152v2 10 transmit/receive surface coil placed under the calf. Investigators can use an MRI compatible ergometer for the calf plantar flexion exercise. This small muscle mass exercise causes a minimal elevation in heart rate and cardiac output and presents low risk. Graded exercise stimuli are presented starting with unloaded plantar flexion and progressing to local muscle maximum: Data are acquired at rest, during exercise, and during post-exercise recovery. Blood values for each of ADP, ATP, Pi, PCr and pH levels are derived from or computed from the spectral data obtained.

Blood Pressure (BP): Clinic BP is measured by oscillometry 3 times with 2 minutes between measurements prior to the exercise testing. During the exercise test, BP and heart rate (HR) are measured continuously using a Finaprese BP monitor (Ohmeda, Inc., Englewood, Colo., USA) with the hand steadied in a support, which can be maintained at a constant height for all occasions. Data can be acquired at rest, during exercise, and for post-exercise recovery periods.

A maximal cycling test can be completed to volitional exhaustion with a road bicycle mounted on a Velodyne ergometer (Velodyne Sports, Laguna Hills, Calif.). The cycle max test is started at 50 Watts with an additional 50 Watts added every 2-minutes until 250 Watts is reached; at this point the increase was 25 Watts every 2-minutes. Gas exchange can be collected in 15-second sampling periods throughout the maximal and 1-minute exercise tests with a Parvomedics metabolic cart (Sandy, Utah). Blood lactate concentrations are collected in duplicate from a finger-stick (droplet of whole blood) at rest and 2-minutes into a seated recovery after the exercise tests (Lactate Pro, Arkray, Inc., Kyoto, Japan). Acute recovery energy expenditure can be compared between cycling exercise bouts with and without experimental cocoa polyphenol+nitrate food product administered to the subject, and comparisons with a standard 2-tailed paired t-test can be performed.

The examples presented above and the contents of the application define and describe examples of the many cocoa combinations, food products, and methods that can be produced or used according to the invention. None of the examples and no part of the description should be taken as a limitation on the scope of the invention as a whole or of the meaning of the following claims.

What is claimed is:

1. A food product comprising 100-200 mg of a plant-derived nitrate as an extract of a plant material and 2 to 5 g of a flavanol-containing cocoa powder, or the equivalent amount of a flavanol-containing cocoa solids-containing product, where the cocoa is not treated with alkali conditions during processing into cocoa powder or cocoa solids, and wherein a maximum of 200 mg of the plant-derived nitrate and a maximum of 5 g of the flavanol-containing cocoa are administered per day.

2. The food product of claim 1, wherein the plant-derived nitrate is selected from one or more of a beet root extract or juice, a hawthorne extract or juice, a lettuce extract or juice, a celery extract or juice, rhubarb extract or juice, and arugula extract or juice.

3. The food product of claim 1, wherein the cocoa powder is present at 2.5 to 5 grams.

4. The food product of claim 1, wherein the plant-derived nitrate is supplied as beet juice or a beet root extract and the cocoa powder is present at 2.5 to 5 grams.

5. The food product of claim 1, wherein the food product is formed into a beverage, a gelled or starch-based product, or a solid food product.

6. The food product of claim 1, wherein the nitrate is supplied as a vegetable juice, an herb juice, a vegetable juice powder, an herb juice powder, or any combination of one or more of these juices or powders.

7. The food product of claim 1, wherein the cocoa solids are supplied as an extract of powder from unfermented cacao beans, an extract or powder from under-fermented cacao beans, an extract of cacao beans, low fat cocoa powder, or non-fat cocoa powder, or any combination of these extracts or powders.

* * * * *